April 25, 1950 V. C. DAVIS 2,504,965
ELECTRICAL BRIDGE NETWORK
Filed Feb. 15, 1949 2 Sheets-Sheet 1

*INVENTOR*
*Vincent C. Davis*

BY:
ATTORNEYS

Patented Apr. 25, 1950

2,504,965

UNITED STATES PATENT OFFICE 2,504,965

ELECTRICAL BRIDGE NETWORK

Vincent C. Davis, Oakland, Calif., assignor to California Research Corporation, San Francisco, Calif., a corporation of Delaware Application February 15, 1949, Serial No. 76,491

4 Claims. (Cl. 177—311)

The present invention relates to electrical circuits of the balanced network type and particularly refers to an arrangement in which a plurality of four-terminal networks commonly known as bridges are interconnected by electrically selective isolating means to a single potential or current responsive means for indicating the amount of greatest unbalance of the interconnected bridges.

This application is in part a continuation of my application Serial No. 758,413, filed July 1, 1947, for an Electrical network.

It is an object of this invention to provide a multiterminal network with provisions for a reference potential which may be a steady or direct current source and any number of pairs of current conducting elements with each of the junctions between these pairs connected by an asymmetrical conducting element to a potential or current indicating means which is also connected to the reference potential. Provision is made to adjust the impedance or resistance of one element of each of these interconnected pairs in such a manner that the potential difference between the junction of the several pairs is such that the indicating means will be unresponsive until one of the elements in the interconnected pairs changes impedance or resistance, for example, due to a physical change therein, sufficiently to reverse the polarity of the potential impressed upon the asymmetrical element so that it will permit current to flow through the indicating means.

Another object is to provide an electrical circuit with a plurality of pairs of elements, one element of each pair being responsive to physical changes or conditions, such as temperature, position, strain or the like, to modify its electrical property, for example, resistance or impedance, whereby a potential or current indicating means will be actuated by any one of the condition responsive elements.

Another object is to provide an electrical circuit adapted to be connected to a plurality of potential controlling or modifying elements, so constructed and arranged that the greatest potential difference set up in said elements will be indicated upon a single potential or current responsive means.

These and other objects and advantages will be further apparent from the attached drawings which form a part of this specification and illustrate two basic arrangements, a preferred embodiment of the invention applied to a plurality of temperature indicating circuits, and an alternative arrangement of the latter with a switching means for determining which of the said circuits is exposed to the highest or lowest temperature.

In the drawings, Figure 1 is a connection diagram of a single four-terminal network embodying this invention.

Figures 1, 2:
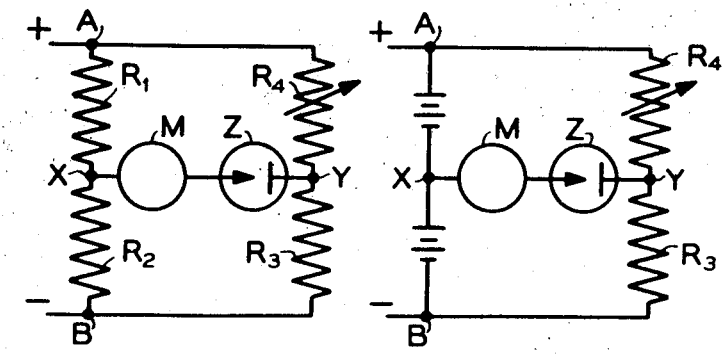
Figure 2 is a diagram of an arrangement similar to that of Figure 1 but with a constant potential source such as batteries replacing the potential dividing resistances of Figure 1.

Referring to the drawing and particularly to Figure 1, reference letters $R_1$, $R_2$, $R_3$ and $R_4$ indicate a conventional bridge arrangement in which a steady potential difference from any suitable source, now shown, is supplied at A and B, and a potential responsive means M, for example, a potentiometer, millivoltmeter, or combination of the two, a vacuum or gaseous discharge tube, or the like, is connected between points X and Y, which are the junctions between $R_1$ and $R_2$, and $R_3$ and $R_4$, respectively. Where the term "potential responsive means" is used in the appended claims it is intended to include means responsive to current flow, such as a milliammeter.

In this embodiment, $R_4$ is designated as being adjustable, and $R_3$ may be of a material having a selected temperature coefficient of resistance, for example, iron, nickel, carbon, or other suitable elements or alloys, so that its resistance will vary according to temperature or other physical conditions, such as mechanical strain. In this invention, as distinguished from conventional practice, an asymmetrical conductor Z, to be referred to as a rectifier, is connected in series with the potential responsive means M. The rectifier may be of any suitable or desired type, for example, a vacuum tube, mineral crystal, metalloid or the like. Rectifier Z has a very low resistance in the direction of conductance and a very high resistance in the opposite direction, and hence serves to selectively control the nature or direction of current and therefore the potential difference which will cause a response of the potential or current indicating means M. For example, if the direction of potential unbalance set up by the ratio of $R_3$ to $R_4$ is in one direction, a current will pass through rectifier Z and impress a potential difference across M which will give an indication of the degree of said unbalance. If the unbalance should be in the opposite direction, rectifier Z would be effective substantially to prevent a current flow and the resulting potential difference across M and no indication of unbalance would be given.

Figure 3:
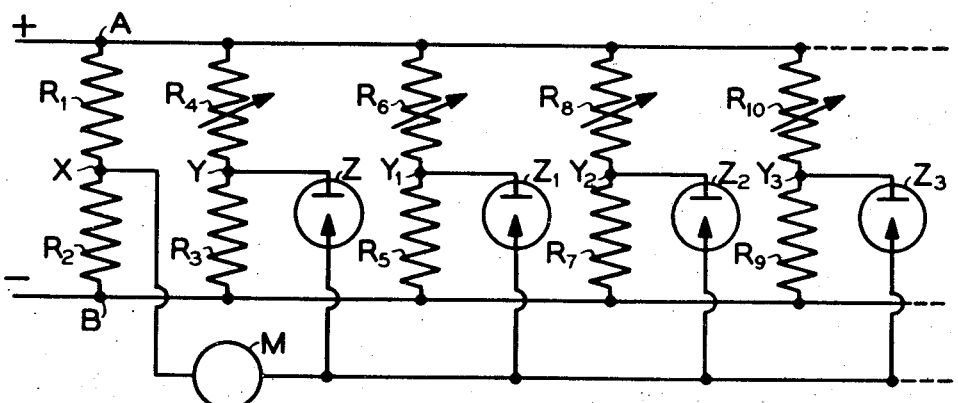
Figure 3 is a connection diagram of an arrangement like that of Figure 1 with the addition of parallel connected pairs of elements actuating a single indicating means.

Referring now to Figure 3 in which corresponding letters and subscripts represent corresponding parts to those just described, it will be noted that additional pairs of resistances or impedances $R_5$ and $R_6$, $R_7$ and $R_8$, $R_9$ and $R_{10}$, have been connected in parallel to the original pair $R_3$ and $R_4$ of the circuit of Figures 1 and 2. The junctions $Y_1$, $Y_2$ and $Y_3$ of the added parallel circuits are connected, respectively, through additional rectifiers $Z_1$, $Z_2$ and $Z_3$ to the common potential or current responsive means M.

In this embodiment, if resistors or impedances $R_4$, $R_6$, $R_8$ and $R_{10}$ are initially adjusted to give various degrees of unbalance but all in the direction that the resulting potential differences between point X and junctions Y, $Y_1$, $Y_2$ and $Y_3$ are of such polarity that rectifiers Z, $Z_1$, $Z_2$ and $Z_3$ have a very high resistance to current flow, then the resistance or impedance of any one of the resistors or impedances $R_3$, $R_5$, $R_7$ or $R_9$ will have to change sufficiently to reverse the direction of potential difference between point X and its junction with its previously adjusted corresponding resistor or impedance before sufficient current will flow through the respective rectifier to actuate the indicating means M. If resistors or impedances $R_3$, $R_5$, $R_7$ and $R_9$ are temperature-sensitive and are subjected to variable temperatures, then resistors or impedances $R_4$, $R_6$, $R_8$ and $R_{10}$ may be calibrated in degrees of temperature and indicating means M will only operate if the temperature of $R_3$, $R_5$, $R_7$ or $R_9$ exceeds the temperature setting or adjustment on its respective corresponding resistor or impedance $R_4$, $R_6$, $R_8$ or $R_{10}$. In this specification the indicating means may include a current controller, such as a relay, a grid-controlled rectifier tube, or any suitable current or potential operated device. Also, where the term "resistance" is used in the appended claims it is intended to include means will offer impedance, such as an inductance coil.

If desired, indicating means M may be calibrated in degrees of temperature and with $R_3$, $R_5$, $R_7$ and $R_9$ at the temperature indicated when there is no potential across M, then $R_4$, $R_6$, $R_8$ and $R_{10}$ would be adjusted for balance. Indicator M, which might be a D'Arsonval type direct current meter would then register the temperature of the one resistor $R_3$, $R_5$, $R_7$ or $R_9$ that was subjected to the highest temperature. It will be noted that for this mode of operation, if the expected change of temperature is in one direction only, an alternating potential could be applied to terminals A and B of the arrangements of Figures 1, 3, 4 and 5. If M is a direct current indicator having a high internal resistance and is shunted by a large capacitance, the latter will be charged to the peak value of each half cycle when any of the rectifiers Z, $Z_1$, $Z_2$ and $Z_3$ offers a low resistance to current flow and the meter M will then indicate the highest temperature imposed upon resistors $R_3$, $R_5$, $R_7$ or $R_9$.

Figure 4:
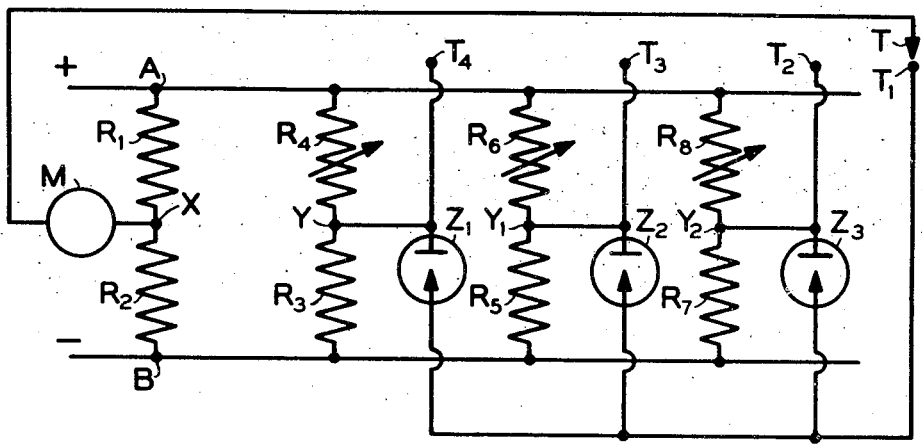
Figure 4 is a connection diagram of an alternate embodiment of the arrangement of Figure 3 with switching means for determining which of the several parallel circuits has the highest degree of unbalance.

The arrangement of Figure 4 is essentially similar to that just described for Figure 3 with the exception of the switching means which is normally connected as shown, with terminal T connected to $T_1$, thus placing the several pairs of resistors or impedances with their respective rectifiers in parallel across the indicating means M. When potential or current responsive means M shows that a degree of unbalance exists, the pair responsible for the indication may be determined by contacting T to terminals $T_2$, $T_3$ and $T_4$ in any desired sequence. In this way each pair of resistors or impedances may be isolated from the other pairs of resistors or impedances and directly connected to M so that the potential responsive means may be connected to the individual pair under observation instead of through the rectifiers $Z_1$, $Z_2$ or $Z_3$ whereby the three pairs of impedances or resistances are in parallel.

Figure 5:
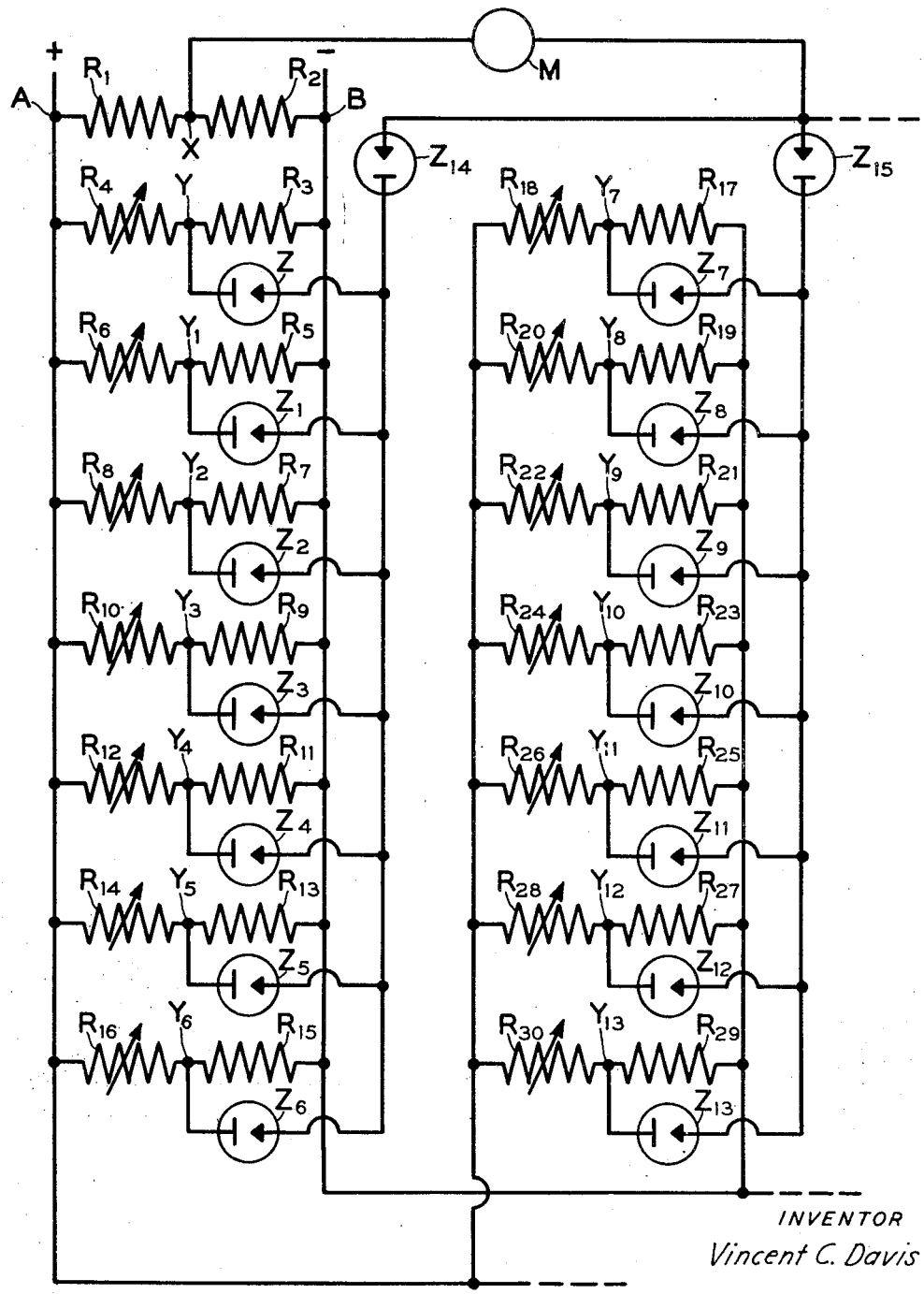
Figure 5 is a connection diagram of an arrangement similar to that of Figure 3 with further isolating means being provided between the single indicating means and the parallel connections to the plurality of resistance or impedance pairs.

While the arrangements shown in Figures 3 and 4 are satisfactory for indicating a change in physical condition in one of the several parallel pairs of resistances or impedances, when a large number of pairs of impedances or resistances is added in parallel and the junction of each pair connected through an asymmetrical conductor to the indicating means, the total resistance between the indicating means M and the parallel junctions of the impedance pairs may become so low that M will not be sensitive only to the greatest current flow in one of the impedance pairs. This is due to the fact that each asymmetrical conductor Z, $Z_1$, $Z_2$ etc. has a back-to-front resistance, which is considerably higher than the front-to-back resistance, but when enough of such asymmetrical conductors are connected in parallel the total resistance of the conductors is equal to the back-to-front resistance of a single conductor divided by the total number of parallel circuits, assuming that the conductors are identical in their back-to-front resistance. As shown in Figure 5, rectifier $Z_{14}$ is provided in series with rectifiers Z, $Z_1$, $Z_2$, $Z_3$, $Z_4$, $Z_5$ and $Z_6$ in order to maintain the desired back-to-front resistance of the rectifiers between M and the parallel pairs of resistances. For the same purpose rectifier $Z_{15}$ is connected in series with the parallel rectifiers $Z_7$, $Z_8$, $Z_9$, $Z_{10}$, $Z_{11}$, $Z_{12}$ and $Z_{13}$. It will be noted that rectifiers $Z_{14}$ and $Z_{15}$ are connected in parallel to current indicating means M on the opposite sides of the potential dividing means $R_1$ and $R_2$ so that the current indicating means M is constantly connected between the junction point X between potential dividing means $R_1$ and $R_2$ and the pair of impedances or resistances subject to the greatest change in physical condition through either rectifier $Z_{14}$ or $Z_{15}$ and any of the parallel rectifiers. It will be apparent to those skilled in the art that the number of rectifiers Z which may be placed in parallel before it is necessary to add a series rectifier, such as $Z_{14}$ or $Z_{15}$, will be wholly dependent upon the back-to-front resistance of the rectifiers. It will also be appreciated that if further banks of series rectifiers, such as $Z_{14}$ and $Z_{15}$, are placed in parallel (as provided by the dotted extension lines in Figure 5) that it may be desirable to add a further series rectifier between the current indicating means M and the common junction to rectifiers $Z_{14}$ and $Z_{15}$.

As an example of the desirability of adding series rectifiers $Z_{14}$ and $Z_{15}$ to the parallel branch rectifiers, I have found that with germanium crystals the back-to-front resistance is on the order of approximately 1 megohm, while the front-to-back resistance is on the order of approximately 200 to 400 ohms. If, as in the circuit shown in Figure 5, seven parallel rectifiers are connected together, the total back-to-front resistance is reduced to approximately 143,000 ohms. This resistance is not sufficiently great to prevent reverse current flow through the current responsive means M which will subtract from the desired forward current flow. Especially is this true when each of the resistances or impedances varies in response to a change in physical condition, such as temperature, and the temperatures to be measured are approximately the same magnitude. Under this condition the greatest potential difference will appear across the rectifier connected to the resistance having the greatest change, but this potential difference may be only slightly larger than that across the other parallel rectifiers so that the forward current through the conducting rectifier is in a range that can be affected by reverse current flow through the parallel circuits due to the lowered back-to-front resistance.

In conclusion, it will be appreciated that this invention comprehends broadly an electrical network in which a single potential or current indicating means is selectively responsive to predetermined changes or potential unbalance set up in said network by one or more resistors or impedance elements, each of the latter connected to said indicating means through an asymmetrical conductor or rectifier which will transmit current when the direction of potential difference in said resistances or impedances is in one direction and will offer a high resistance to current flow when said potential difference is in the opposite direction. Desirably, but not necessarily, selective switching means may be provided for connecting said potential indicating means to said resistances or impedances so that the individual circuit in which the unbalance is caused, for example, by a physical change, such as temperature, may be identified.

It is obvious that numerous changes and modifications of the networks illustrated could be made without departing from this invention, and all such changes that are included within the scope of the appended claims are embraced thereby.

I claim:

1. An electrical bridge circuit comprising a first pair of resistances connected across a potential source, potential responsive means connected to the junction of said first pair, a plurality of pairs of resistances connected across said potential, an asymmetrical conductor for each of said plurality of pairs having one terminal connected to the junction of each of said plurality of pairs and the opposite terminal connected in common, and a further asymmetrical conductor connected between said potential responsive means and the common connection of the first-mentioned asymmetrical conductors.

2. An electrical network of the bridge type comprising a potential responsive means, a rectifier in series with said means, a plurality of rectifiers having one terminal connected in parallel branches to the first said rectifier, a plurality of resistance pairs connected in parallel to a potential source, the junction of one of said pairs being directly connected to said potential responsive means, and the junctions of the remainder of said pairs being connected to the opposite terminal of each of said plurality of rectifiers, one of the resistances in the last mentioned pairs having a re-resistance variable in response to a change in physical condition.

3. An electrical network of the bridge type comprising a pair of potential dividing means connected across a potential source, potential responsive means connected to the junction of said dividing means, a plurality of impedance pairs connected in parallel across said potential source, one of the impedances in each pair being responsive to a change in physical condition, a plurality of asymmetrical conductors corresponding to each of said pairs and having one terminal connected in common and the opposite terminal connected to the junction of its corresponding pair, and a further asymmetrical conductor connected between the common connection of the first-mentioned conductors and said potential responsive means whereby said means is adapted to operate in response to a potential unbalance between the junction of said dividing means and the junction of any of said impedances.

4. An electrical bridge circuit comprising a plurality of pairs of impedances connected across a potential source, a potential responsive means connected to the junction of one of said pairs, a rectifier for each of said remaining pairs of impedances having one terminal connected to the junction of each of said remaining pairs and the opposite terminal connected in common, and a further rectifier connected between the common connection for said first-mentioned rectifiers and said potential responsive means so that said means is connected between the junction of said first-mentioned impedance pair and through said rectifiers to the junction of each of said other impedance pairs.

VINCENT C. DAVIS.

REFERENCES CITED

The following references are of record in the file of this patent:

UNITED STATES PATENTS

| Number | Name | Date |
| --- | --- | --- |
| 2,112,228 | Crago | Mar. 29, 1938 |
| 2,456,499 | Fritzinger | Dec. 14, 1948 |